United States Patent
Blanchard

(10) Patent No.: US 8,393,985 B2
(45) Date of Patent: Mar. 12, 2013

(54) VARIABLE-SPEED BELT DRIVE AND VARIABLE-SPEED DRIVE DEVICE EQUIPPED WITH SUCH A VARIABLE-SPEED DRIVE UNIT

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 1632 days.

(21) Appl. No.: 11/495,461

(22) Filed: Jul. 31, 2006

(65) Prior Publication Data

US 2007/0026981 A1 Feb. 1, 2007

(30) Foreign Application Priority Data

Jul. 29, 2005 (FR) ...................................... 05 08094
Jan. 18, 2006 (FR) ...................................... 06 00440

(51) Int. Cl.
*F16H 55/56* (2006.01)
(52) U.S. Cl. ................. 474/37; 474/19; 474/46
(58) Field of Classification Search .............. 474/37–38, 474/8–10, 19, 46
See application file for complete search history.

(56) References Cited

U.S. PATENT DOCUMENTS

| | | | |
|---|---|---|---|
| 2,792,712 A | | 5/1957 | Gibson |
| 5,527,225 A | * | 6/1996 | Dick ................................ 474/12 |
| 2002/0032088 A1 | * | 3/2002 | Korenjak et al. ............... 474/14 |
| 2002/0183145 A1 | * | 12/2002 | Blanchard ........................ 474/19 |
| 2003/0199346 A1 | * | 10/2003 | Wians .............................. 474/38 |
| 2005/0148415 A1 | | 7/2005 | Hartley |

FOREIGN PATENT DOCUMENTS

| | | |
|---|---|---|
| EP | 1536960 | 8/1968 |
| EP | 0 135 702 | 4/1985 |
| EP | 1396664 | 3/2004 |
| FR | 2774953 | 8/1999 |
| FR | 2824376 | 11/2002 |

\* cited by examiner

*Primary Examiner* — Robert A Siconolfi
*Assistant Examiner* — Anna Momper
(74) *Attorney, Agent, or Firm* — Young & Thompson

(57) ABSTRACT

A variable-speed drive unit, in particular for a variable-speed drive device, such as a riding mower, includes at least one belt transmission between two pulleys, each mounted on a shaft, each pulley including variably-spaced flanges. In this variable-speed drive unit, each pulley has a flange that equipped with a loading device that tends to exert, in a permanent manner and in the active state of the transmission, an axial effort in the direction in which the flanges move toward the pulley to clamp the belt between the flanges, whereby one of the pulleys has a loading device that exerts a lesser axial effort than the other device, and whereby one of the pulleys also includes, independently of the loading device, a manual control element for drawing together or separating flanges that can exert on the flange a slight control effort corresponding essentially to the power difference of the loading devices.

20 Claims, 4 Drawing Sheets

VARIABLE-SPEED BELT DRIVE AND VARIABLE-SPEED DRIVE DEVICE EQUIPPED WITH SUCH A VARIABLE-SPEED DRIVE UNIT

This invention relates to a variable-speed belt drive of the type comprising at least two pulleys with variably-spaced flanges as well as a variable-speed drive device, such as a lawnmower equipped with such a variable-speed drive unit.

The variable-speed drive units, consisting of a belt transmission between a driving pulley and a driven pulley, applied in particular to variable-speed drive devices, such as a lawnmower, are well known to those skilled in this art as Patent FR-A-2,824,376 or Patent FR-A-2,780,129 illustrates in particular.

In such an application, the driving pulley is mounted on the cutting blade-holder drive shaft or on a shaft that is connected to the drive shaft by a first transmission, while the driven pulley is mounted on the input shaft of a transmission housing whose output shaft is coupled directly or via a suitable transmission to the travel wheels of the vehicle. Each of the pulleys is equipped with at least one moving flange to increase the speed variation range. The operation of such a variable-speed drive unit of the prior art is as follows. At minimum speed, the flanges of the driving pulley are separated. The flanges of the driven pulley are drawn together such that the belt is wound over a large diameter around the driven shaft. To ensure an increase in speed, one or the other of the pulleys is actuated in a direction tending to separate the flanges of the driven pulley to reduce the winding diameter of the belt and to make the flanges draw close to the driving pulley. The procedure is reversed to ensure a reduction in the speed. In this variable-speed drive unit of the prior art, in accordance with the Patent FR-2,824,376, one of the pulleys can be equipped with an element for continuous adjustment of the tension of the belt controlled automatically based on the torque transmitted between said pulleys, while the other pulley is equipped with an element for manual control of speed variation, which, in the active state, generates an axial stress on the moving flange of one of the pulleys, only under the action of an operator. The drawback of such a solution resides in the extent of the control effort to be produced by the operator to ensure the speed variation.

Also known through the Patent FR-1,536,960 is a variable-speed drive unit that consists of two pulleys: one, the driving pulley, equipped with a flange compression spring; the other, the receiving pulley, equipped with an element for automatic speed variation combined with a spring that is used to keep the flanges separated. Speed variation is ensured automatically by rollers working with a ramp, whereby this cooperation is based on the resistance to the opposite rotation by the shaft that supports the rollers/ramp unit. Thus, the automatic speed variation is based on the resisting torque, the speed decreasing automatically when the resisting torque increases. In the case of an automatic speed variation, the problem of the control effort to be produced is not raised.

In the same way, the Patent EP-1,396,664 describes a variable-speed drive unit that consists of two pulleys, one a driving pulley, the other a receiving pulley. Each pulley is equipped with an attached flange and a moving flange that is axially retracted by a spring in the direction of the attached flange. The moving flange can also be moved by supplying oil from a chamber located on the back of the moving flange. In this case, each pulley is equipped with a control element for speed variation that is not controlled manually but rather hydraulically. Consequently, again, the problem of the control effort to be produced is not raised since the control element is not a manual control element.

One object of this invention is therefore to propose a variable-speed belt drive whose design makes it possible to reduce the control effort to be produced by the operator, thus facilitating the driving of the vehicle.

Another object of the invention is to propose a variable-speed belt drive whose design, although simplified and limited to two loading devices and an element for manual control of speed variation, makes it possible to reduce the control effort to be produced.

To this end, the invention has as its object a variable-speed drive unit, in particular for a variable-speed drive device, such as a riding mower, whereby this variable-speed drive unit comprises at least one belt transmission between two pulleys, each mounted on a shaft, each pulley comprising variably-spaced flanges, characterized in that each pulley has a flange that is equipped with a loading device that tends to permanently exert, in the active state of the transmission, an axial effort in the direction in which flanges move toward the pulley to clamp the belt between said flanges, whereby one of the pulleys has a loading device that exerts a lesser axial effort than the other device, and whereby one of the pulleys also comprises, independently of the loading device, a manual control element for drawing together or separating flanges that are able to exert on the flange a slight control effort essentially corresponding to the difference in power of the loading devices.

Thanks to such a solution, the effort to be produced by the operator corresponds simply to the difference in force of the loading systems. Actually, the loading devices have no effect on the speed variation and their object is simply to clamp the flanges on the belt and to prepare the speed variation. The speed variation is then ensured by the manual control element for speed variation on which the operator exerts a slight control effort. Facility of control results therefrom.

According to a preferred embodiment of the invention, the flange that is free of a loading device of each pulley is mounted integrally in rotation with the pulley-support shaft while the flange that is equipped with a loading device is mounted to move axially and angularly around said pulley-support shaft at least by means of the loading device for the purpose of ensuring clamping of the belt by drawing together flanges based on the torque transmitted between said pulleys.

The flange that moves axially and angularly of each pulley is therefore moved under the combined action of the belt that is in friction contact with the flange and the loading device mounted on said flange.

The loading device, mounted on the flange that moves axially and angularly around the pulley-support shaft, preferably consists of interlocking contoured ramps, one located on the flange moving axially and angularly, and the other on an opposite part that is integral in rotation with the shaft, whereby these ramps are separated from one another at least under the action of the torque transmitted by friction contact between the moving flange and the belt, whereby this separation of the ramps tends to create a drawing-together of said flanges.

The invention also has as its object a variable-speed drive device, such as a lawnmower, characterized in that it incorporates a variable-speed drive unit of the above-mentioned type.

The invention will be well understood from reading the following description of embodiments, with reference to the accompanying drawings in which.

Figure 1:
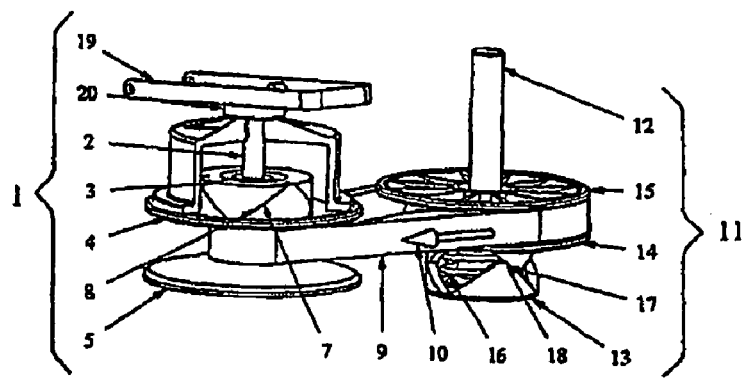
FIG. 1 shows an elevation view of a variable-speed drive unit according to the invention shown with minimum speed.
Figure 2:
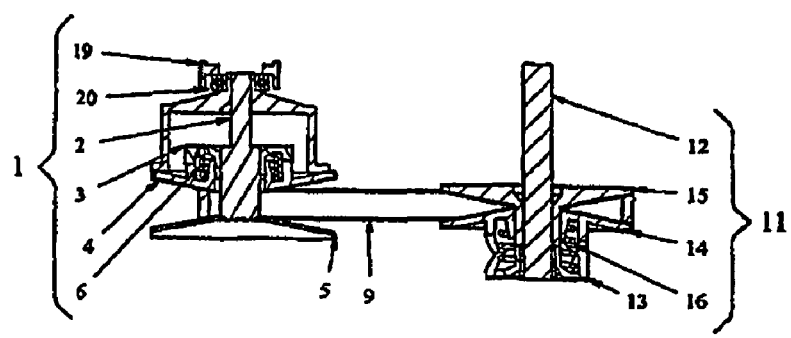
FIG. 2 shows a cutaway view of the variable-speed drive unit of FIG. 1.
Figure 3:
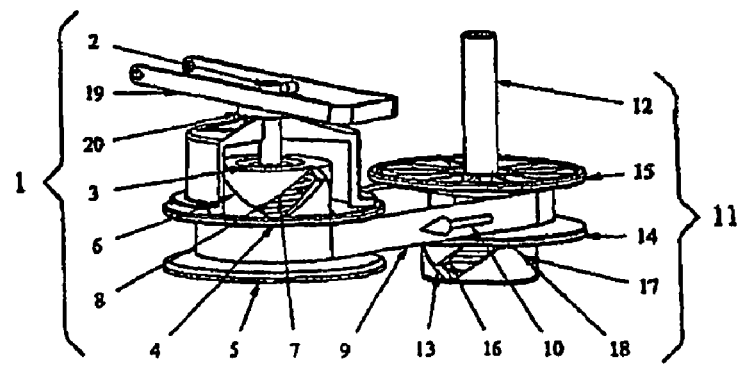
FIG. 3 shows an elevation view of a variable-speed drive unit according to the invention with average speed.
Figure 4:
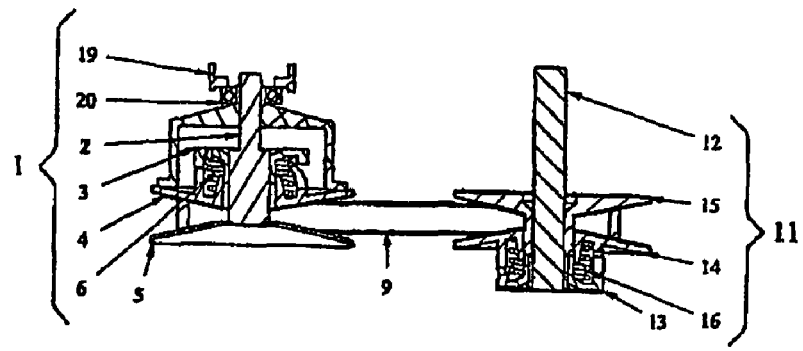
FIG. 4 shows a cutaway view of FIG. 3.
Figure 5:
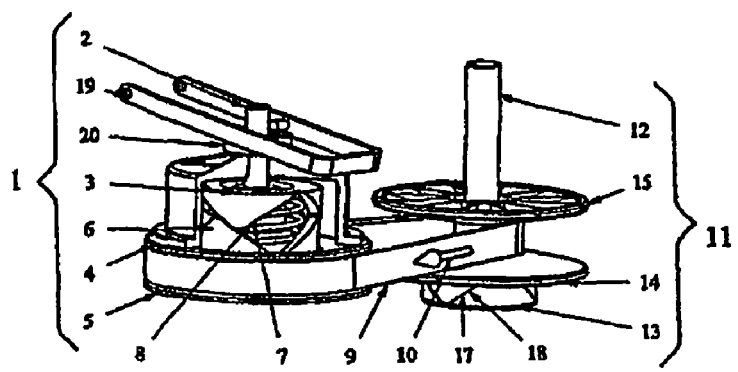
FIG. 5 shows a variable-speed drive unit according to the invention with maximum speed.
Figure 6:
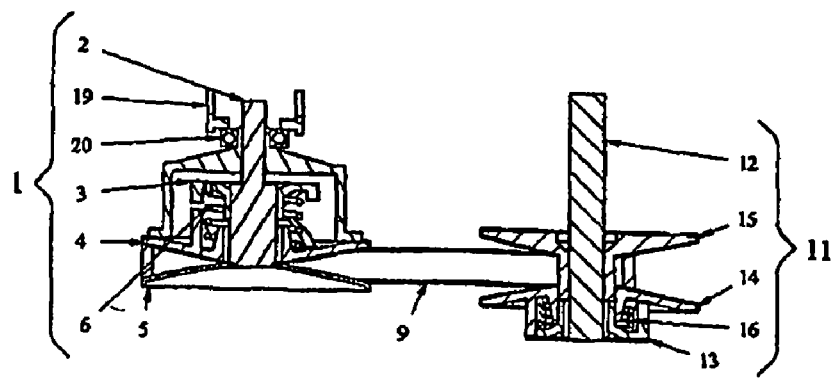
FIG. 6 shows a cutaway view of FIG. 5.

As mentioned above, the variable-speed belt drive 9, object of the invention, comprises at least two pulleys 1, 11 with variably-spaced flanges 4, 5 and 14, 15. Actually, each pulley 1, 11 comprises flanges 4, 5 and 14, 15 that move in the direction of a drawing-together or a separation, the drawing-together of the flanges of a pulley causing, via belt 9, the separation of the flanges from the other pulley. Such a variable-speed drive unit can be applied to variable-speed drive devices, such as a lawnmower. In this case, the driving pulley, shown in 1 with figures, is driven by the motor while the driven pulley, shown in 11 with figures, is mounted on the input shaft of a reduction gear whose output shaft constitutes a drive shaft of the wheels of the vehicle.

In a manner characteristic of the invention, each pulley 1, 11 mounted on a shaft 2, 12 has a flange 4, 14 that is equipped with a loading device that tends, in the active state of the belt transmission 9, to permanently exert an axial effort in the direction in which flanges 4, 5; 14, 15 move toward the pulley 1; 11 to clamp the belt 9 between said flanges 4, 5 or 14, 15 and to ensure a permanent tension of the belt with the exclusion of any speed variation. It should be noted that active state of the transmission is defined as a state in which the movement of the shaft that supports the so-called driving pulley can be transmitted to the shaft that supports the so-called driven pulley. One of the pulleys, in this case the pulley that is shown in 1 with figures, has a loading device that exerts a lesser axial effort than the other device. This pulley also comprises a manual control element 19 for drawing together or separating the flanges that can exert on the moving flange 4, equipped with a minimum-effort loading device, a slight control effort corresponding to the difference in power of the loading devices. This control element 19, independently of the loading device, exerts on the flange a direction effort that is identical to that of the axial effort exerted by the loading device. It could also be considered to position the speed variation control element 19 on the pulley that is equipped with the most powerful loading device, this control element that provides, in this case, an effort that is the opposite of that of the loading device, this effort corresponding to the difference in power between the two loading devices. This embodiment is not shown. Independently of the direction of the effort exerted by the control element, the latter is always exerted in the same direction over the entire speed variation range. There results therefrom a simplicity for the operator that produces a control effort that is always in the same direction.

In a first embodiment according to FIGS. 1 to 6, each pulley 1, 11 consists of a flange 5; 15 that is generally attached to a shaft 2, 12 and a flange 4, 14 that can move axially and angularly around said shaft 2, 12 at least via the loading device. The two flanges of the pulley can therefore be driven by a relative movement of rotation. The loading device consists of interlocking contoured ramps 7, 8 or 17, 18, one 7, 17 located on the moving flange 4, 14 and the other 8, 18 on an opposite part 3, 13 that is integral in rotation with shaft 2, 12. These ramps 7, 8 and 17, 18 are separated from one another at least under the effect of the transmitted torque. Actually, the belt 9/moving flange friction contact entrains an angular movement of the flange and consequently an axial movement of the flange because of the presence of the ramps. At least the ramps 7, 8; 17, 18 of the loading device of the pulley 1, 11, lacking manual control element 9 for drawing together or separating flanges, are separated from one another under the combined effect of the transmitted torque and a spring 6, 16 that is inserted between moving flange 4, 14 and opposite part 3, 13. In the examples shown in FIGS. 1 to 6, the ramps 7, 8 and 17, 18 of each loading device are separated from one another under the combined effect of the transmitted torque and a spring 6, 16. This separation of ramps 7, 8; 17, 18 tends to cause a drawing-together of said flanges 4, 5; 14, 15 and, consequently, a clamping of the belt 9.

Thus, such a loading device can be considered as affecting the form of a cam that consists of two coaxial plates with inclined ramps with sliding contact, whereby one of the plates is integral in rotation with the moving flange 4, 14 of the pulley, and whereby the other plate or opposite part 3, 13 is integral in rotation with the shaft that supports the pulley. The torsion spring 6, 16 that is inserted between the ramp-support plates retracts the ramp-support plates into a separated position. Generally, the ramp-support plate, integral in rotation with the moving flange, is made of a single part with said flange. The spring 6, 16 of the loading device, inserted between moving flange 4, 14 and opposite part 3, 13, is a generally helicoidal spring that winds around the shaft 2, 12 of the pulley 1, 11, whereby this spring 6, 16 is attached at one of its ends to the moving flange 4, 14 and at its other end to the opposite part 3, 13 in such a way as to work both in compression and in torsion. The power difference between the two loading devices can be due in particular to the selection of the spring or to the ramp section. At least one of the pulleys, in this case, in the examples shown, the driving pulley, is equipped with an element 19 for manual control of the speed variation also acting on said pulley.

In another embodiment, not shown, in which the pulleys constitute, on the one hand, a driving pulley, and, on the other hand, a driven pulley, the element 19 for manual control of speed variation can act in an equivalent manner on the driven pulley. The element for manual control of speed variation can therefore act either on the driven pulley or on the driving pulley.

This control element can assume a large number of shapes. In the example shown in FIG. 2, the control element consists of a fork 19 that can be moved angularly by the operator, whereby this fork acts on the moving flange 4 in the direction of a drawing-together or a separation of the moving flange 4 from attached flange 5 based on the desired speed. As the flange 4 is driven in rotation via the part 3 that is integral in rotation with the shaft 2, a rolling element 20 is inserted between flange 4 and fork 19 to make it possible for the fork 19 to exert, via the rolling element 20 and a bell, an axial effort on said flange 4.

Quite obviously, other embodiments of the control element can also be considered.

Thanks to such a design of the variable-speed drive unit, if it is imagined that the loading devices exert, on the one hand, a permanent axial effort on the order of 450 N on the driving pulley that is equipped with the manual control element and, on the other hand, a permanent axial effort on the order of 500 N at minimum speed on the driven pulley, the operator should, by acting on the control element, only produce a control effort of close to 50 N. There thus results therefrom a facility of the speed variation control, whereby the speed can vary within a range of between 1 and 9 km/h.

Figure 8:
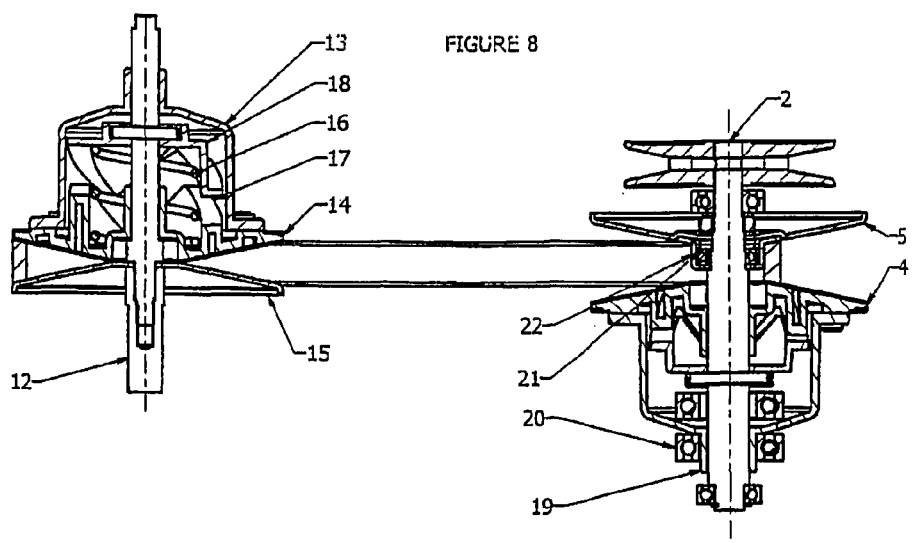
Figure 9:
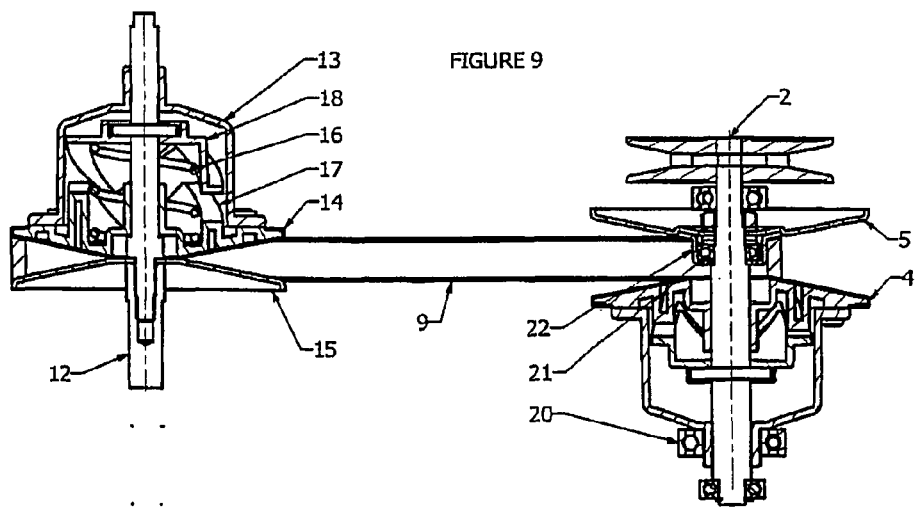
Figure 10:
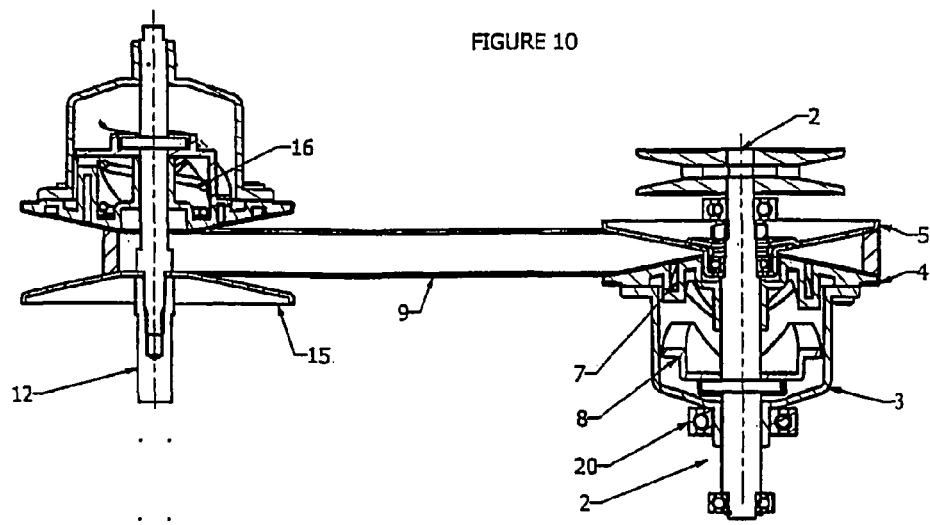

In a particular embodiment of the invention, shown in FIGS. 8 to 10, the variable-speed drive unit is a variable-speed drive unit that can be disengaged and that comprises at least one disengaged position that corresponds to a so-called inactive position of the belt transmission 9 in which any transmission of movement from the shaft that supports the so-called driving pulley to the shaft that supports the so-called driven pulley is prevented.

Thus, by way of example, the shaft 2, 12 that supports the so-called controlled pulley 1, 11, whose flanges 4, 5; 14, 15 are controlled by drawing together or by separation by a manual control element 19, is equipped with a so-called loose element 21, such as a roller, a ring, or a rolling bearing that has at least one surface mounted to rotate freely on said shaft 2, 12 and around which winds at least partially the belt 9 in a position away from the flanges 4, 5; 14, 15 of the pulley 1, 11 corresponding to the inactive or disengaged position of the transmission, so as to prevent any transmission of movement between the pulley-support 1, 11 shafts 2, 12, the moving flange 4, 14 of the controlled pulley 1, 11 that covers said loose element 21 during the drawing-together of said flanges 4, 5; 14, 15 to make possible the winding of the belt 9 inside the groove provided by the flanges 4, 5; 14, 15 of the controlled pulley 1, 11 and to allow the passage of the variable-speed drive unit from a disengaged position to an engaged position.

This embodiment of the variable-speed drive unit differs from the embodiments of FIGS. 1 to 6 only by the presence of a winding element 21 that is mounted here to rotate freely on the shaft 2 that is equipped with the controlled driving pulley 1. It should be noted that in FIGS. 8 to 10, the control element 19 for drawing together and separating flanges has not been shown. This loose element 21 thus makes it possible for a variable-speed drive unit to use a so-called disengaged position in which the movement of the shaft 2 that is driven in rotation cannot be transmitted via the belt 9 to the shaft 12 that supports a driven pulley because the belt 9 is wound on the outside surface of the element 21 that is mounted in a loose manner such that the movement of the shaft 2 is not transmitted to said belt 9. To allow such a transmission of movement, it is necessary to pass from a disengaged or inactive position of the transmission to an engaged or active position of the transmission. For this purpose, the drawing-together of flanges 4, 5 of the driving pulley is controlled. Because the moving flange 4 of this driving pulley comprises, at its hollow central portion, a housing that can cover the loose element 21 when the flanges of the controlled pulley are drawn together, the passage of the variable-speed drive unit from a disengaged position to an engaged position results therefrom, as the passage between the FIGS. 8 and 9 illustrates. The belt is then clamped between the flanges 4 and 5 and makes possible the transmission of movement from the shaft 2 to the shaft 12. It is noted that, in this embodiment of a variable-speed drive unit that can be disengaged, the loading device of the driving or controlled pulley, i.e., the one whose flanges are controlled by drawing-together or by separation by a speed variation control element 19, does not comprise a spring that tends to retract the constituent ramps of the loading device into a position away from said ramps, and, consequently, in a drawn-together position of the flanges. As a result, the loading devices formed essentially by ramps can be identical from one pulley to the next. In this embodiment, the loading device of the driving pulley that is free of a spring is positioned on the shaft 2 such that under the effect of its own weight, the flanges of the pulley are brought automatically into a position away from said flanges corresponding to the disengaged position. As soon as the speed variation control element 19 controls the drawing-together of said flanges, corresponding to the passage from FIG. 8 to FIG. 9, the transmission of movement via the belt 9 is performed, and a permanent axial effort can be exerted by the loading device formed by the ramps 7, 8 mounted on the controlled pulley. The operation of the loading device, at the ramps, is equivalent to the one described in what is mentioned above.

In the embodiment shown in FIG. 8, there is provided, integral in rotation with the so-called loose element 21, between so-called loose element 21 and belt 9, a crosspiece 22, whereby this crosspiece 22 prevents, up to a predetermined drawing-together position of the flanges, a contact of the belt 9 with a flange of the pulley, during the passage from the disengaged position to the engaged position. This crosspiece allows gentle engagement.

The operation of such a variable-speed drive unit is analogous to the one that is described for the prior art, namely a drawing-together of the flanges of the driving pulley, after the engagement of said variable-speed drive unit, will generate an increase in the speed while a separation of said flanges of the driving pulley quite obviously accompanying a drawing-together of the flanges of the driven pulley will cause a reduction in speed. It should be noted that the loading devices, as described above, exert, in the active state of the transmission, i.e., in the engaged position of the variable-speed drive unit, a permanent axial effort that is variable based on the torque transmitted between said pulleys. The direction of rotation of the pulleys is shown by the arrow 10 in the figures.

It is also noted that in the examples shown, the loading devices are mounted opposite on both sides of the belt 9 to prevent the incline of the belt 9 on its axis. Thus, in the examples shown, the driving pulley is equipped with a loading device that extends on one side of the plane of the belt while the driven pulley is equipped with a loading device that extends on the other side of the plane of the belt.

Figure 7:
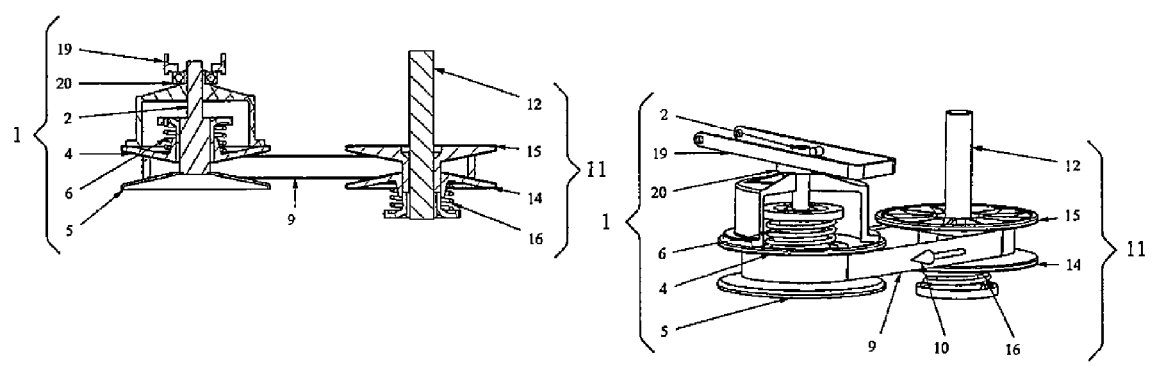
FIG. 7 shows another embodiment of a variable-speed drive unit according to the invention, and FIGS. 8 to 10, in the form of cutaway views, show a variable-speed drive unit that can be disengaged, according to the invention, in disengaged position (FIG. 8), in slow-speed engaged position (FIG. 9) and in high-speed engaged position (FIG. 10).

In another embodiment in accordance with the one shown in FIG. 7, the loading device each time consists of a power spring that is different from one device to another. The advantages of such a variable-speed drive unit are less than those obtained in the case of FIGS. 1 to 6. The loading device in this case is no longer a device that is sensitive to torque but on the contrary exerts a constant axial effort.

In short, the variable-speed drive unit described above each time comprises two similar loading devices for clamping the belt and a manual control element for independent speed variation.

The invention claimed is:

1. Variable-speed drive unit, comprising:
a first pulley and a second pulley (1, 11),
each of the two pulleys mounted on a corresponding pulley-support shaft (2, 12),
each of the two pulleys (1, 11) comprising a pair of variably-spaced flanges (4, 5; 14, 15); and
at least one transmission belt (9) between the two pulleys (1, 11), the two pulleys further comprising a first loading device and a second loading device respectively equipping a first flange (4, 14) of each pair of flanges, each of the first and second loading devices tending to exert, in a permanent manner and in the active state of the transmission, an axial effort in the direction causing the flanges (4, 5; 14, 15) to move inwardly to clamp the belt (9) between said flanges (4, 5; 14, 15), wherein the first loading device exerts a lesser axial effort than an axial force exerted by the second loading device; and one of the two pulleys also comprises a manual control element (19) for, independently of the corresponding loading device, drawing together or separating the flanges of the one pulley by exerting, on the first flange of the one pulley, a slight control effort corresponding essentially to a power difference of the first and second loading devices.

2. Variable-speed drive unit according to claim 1, wherein the second flange (5, 15) of each pulley (1, 11) is mounted integral in rotation with the pulley-support shaft (2, 12), while the first flange (4, 14) that is equipped with the loading device is mounted to move axially and angularly around said pulley-support shaft (2, 12) at least via the loading device so as to ensure a clamping of the belt (9) by drawing together the flanges (4, 5; 14, 15) based on torque transmitted between said pulleys.

3. Variable-speed drive unit according to claim 2, wherein the loading device, mounted on the first flange (4, 14) that moves axially and angularly around the pulley-support shaft (2, 12), comprises interlocking contoured ramps (7, 8, 17, 18), a first of the ramps (7, 17) located on the first flange (4, 14) moving axially and angularly, and a second of the ramps (8, 18) located on an opposite part (3, 13) that is integral in rotation with the shaft, whereby the first and second ramps (7, 8; 17, 18) are separated from one another at least under the action of torque transmitted by friction contact between the moving first flange (4, 14) and belt (9), whereby this separation of the ramps (7, 8; 17, 18) tends to create a drawing-together of said first and second flanges (4, 5; 14, 15).

4. Variable-speed drive unit according to claim 2, wherein the variable-speed drive unit is a variable-speed drive unit that can be disengaged and comprises at least one disengaged position corresponding to an inactive position of the belt (9) in which any transmission of movement of the driving pulley-support shaft to the driven pulley-support shaft is prevented.

5. Variable-speed drive device unit in accordance with claim 2 incorporated in a lawnmower.

6. Variable-speed drive unit according to claim 3, wherein at least the ramps (7, 8: 17, 18) of the loading device of the pulley (1, 11), lacking the manual control element (19), are separated from one another in the direction of a drawing-together of the flanges (4, 5; 14, 15) under the combined effect of the transmitted torque and a spring (6, 16) inserted between moving first flange (4, 14) and opposite part (3, 13).

7. Variable-speed drive unit according to claim 3, wherein the variable-speed drive unit is a variable-speed drive unit that can be disengaged and comprises at least one disengaged position corresponding to an inactive position of the belt (9) in which any transmission of movement of the driving pulley-support shaft to the driven pulley-support shaft is prevented.

8. Variable-speed drive device unit in accordance with claim 3 incorporated in a lawnmower.

9. Variable-speed drive unit according to claim 6, wherein the spring (6, 16) is a generally helicoidal spring that is wound around the shaft (2, 12), this spring (6, 16) is attached at a first end to the moving first flange (4, 14) and at a second end to the opposite part (3, 13) to work both in compression and in torsion.

10. Variable-speed drive unit according to claim 6, wherein the variable-speed drive unit is a variable-speed drive unit that can be disengaged and comprises at least one disengaged position corresponding to an inactive position of the belt (9) in which any transmission of movement of the driving pulley-support shaft to the driven pulley-support shaft is prevented.

11. Variable-speed drive device unit in accordance with claim 6 incorporated in a lawnmower.

12. Variable-speed drive unit according to claim 9, wherein the variable-speed drive unit is a variable-speed drive unit that can be disengaged and comprises at least one disengaged position corresponding to an inactive position of the belt (9) in which any transmission of movement of the driving pulley-support shaft to the driven pulley-support shaft is prevented.

13. Variable-speed drive device unit in accordance with claim 9 incorporated in a lawnmower.

14. Variable-speed drive unit according to claim 1, wherein the variable-speed drive unit is a variable-speed drive unit that can be disengaged and comprises at least one disengaged position corresponding to an inactive position of the belt (9) in which any transmission of movement of the driving pulley-support shaft to the driven pulley-support shaft is prevented.

15. Variable-speed drive unit according to claim 14, wherein the pulley-support shaft (2, 12) mounting the one pulley having the manual control element (19) is equipped with a loose element (21) that has at least one surface mounted to rotate freely on said shaft (2, 12) and around which is wound at least partially the belt (9) in a position away from the flanges (4, 5; 14, 15) of the pulley (1, 11) corresponding to the inactive or disengaged position of the transmission so as to prevent any transmission of movement between the pulley-support shafts (2, 12), whereby the moving first flange (4, 14) of the controlled pulley (1, 11) covers said loose element (21) during the drawing-together of said flanges (4, 5; 14, 15) to allow winding of the belt (9) inside a groove provided by the flanges (4, 5; 14, 15) of the controlled pulley (1, 11) and to allow the passage of the variable-speed drive unit from a disengaged position to an engaged position.

16. Variable-speed drive device unit in accordance with claim 14 incorporated in a lawnmower.

17. Variable-speed drive unit according to claim 15, wherein there is provided, integral in rotation with the so-called loose element (21), between the so-called loose element (21) and the belt (9), a crosspiece (22), whereby the crosspiece (22) prevents, up to a predetermined drawing-together position of the flanges, a contact of the belt (9) with either flange of the pulley, during the passage from the disengaged position to the engaged position.

18. Variable-speed drive device unit in accordance with claim 15 incorporated in a lawnmower.

19. Variable-speed drive unit according to claim 1, wherein the first loading device and the second loading device each comprise a power spring.

20. Variable-speed drive device unit in accordance with claim 1 incorporated in a lawnmower.

* * * * *